June 28, 1966  W. M. NORRIS  3,257,786
COTTON PICK-UP APPARATUS
Filed Sept. 25, 1964
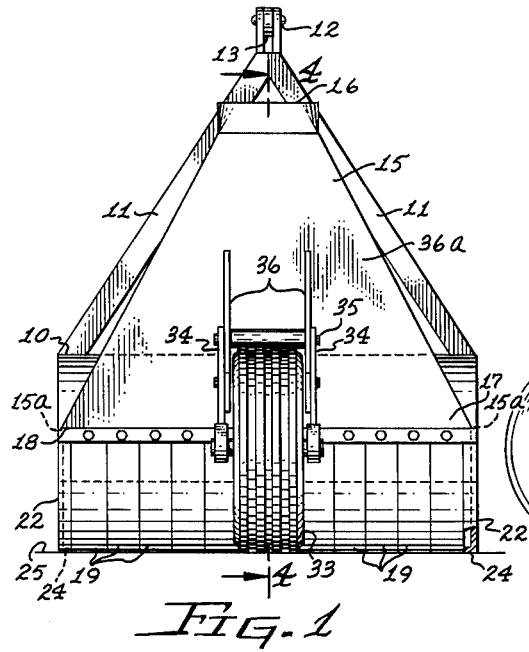
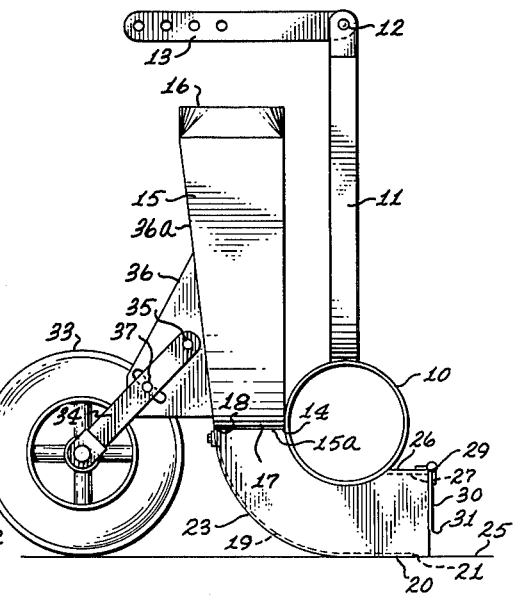
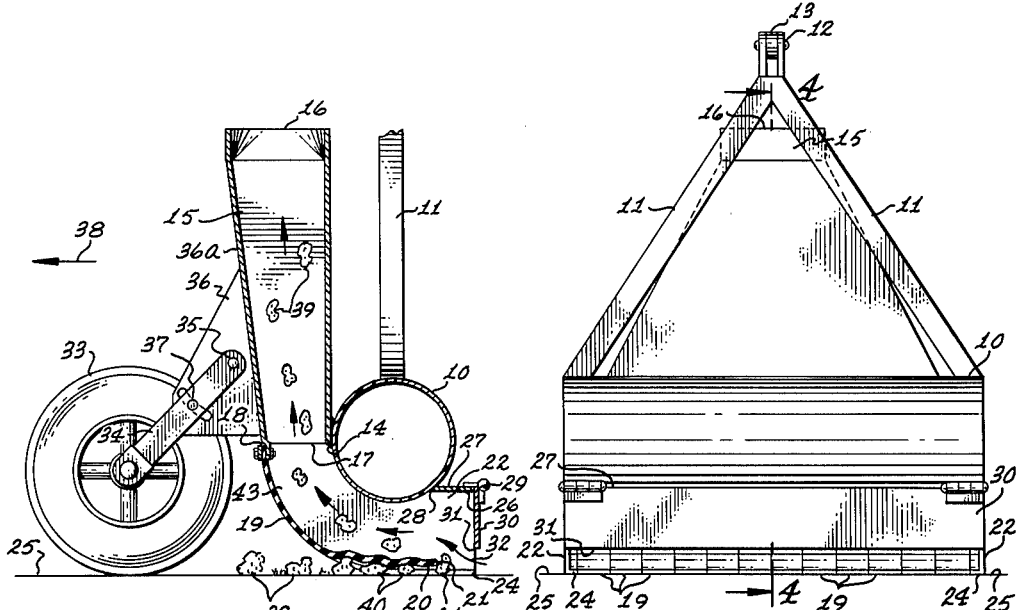
INVENTOR.
W. MORGAN NORRIS
BY
Willard S. Gow
ATTORNEY

3,257,786
COTTON PICK-UP APPARATUS
William Morgan Norris, Lovington, N. Mex., assignor of fifty percent to U-Bar Ranch, Mesa, Arizona, a copartnership
Filed Sept. 25, 1964, Ser. No. 399,248
1 Claim. (Cl. 56—28)

This invention pertains to improvements in agricultural machinery and is particularly directed to cotton pick-up apparatus.

One of the objects of this invention is to provide a cotton pick-up apparatus which functions on the principle of suction:

Another object is to provide a cotton pick-up apparatus which is simple in construction and free of mechanical moving parts requiring careful fitting and adjustments.

A further object is to provide a cotton pick-up machine having yielding elements sliding over the ground surface which drag on the ground to hold suction to the rear of the elements and which elements roll up the cotton lying on the ground, tearing it away from the ground so that the released rolled up cotton rolls to the rear end of the yielding elements where it springs up and is removed by suction.

Further features and advantages of this invention will appear from a detailed description of the drawings in which:

FIG. 1 is a front elevation of the cotton pick-up apparatus incorporating the features of this invention.

FIG. 2 is a right hand side elevation of the apparatus shown in FIG. 1.

FIG. 3 is a rear elevation of the apparatus shown in FIGS. 1 and 2.

FIG. 4 is an enlarged sectional view on the line 4—4 of FIGS. 1 and 3.

As an example of one embodiment of this invention there is shown a cotton pick-up apparatus comprising a frame 10 of cylindrical shape to which are fixed suitable upright standards 11 which are pivotally connected at 12 to the support arm 13 suitably connected to the usual tool lifting and supporting apparatus of a tractor. Fixed at its lower front edge 14 to the frame 10 is the suction manifold 15 having its top outlet 16 connected to a suitable suction blower and receptacle, not shown. The laterally enlarged intake end 17 projects downwardly tangentially of the cylindrical frame 10 and has fixed to its lower rear edge 18 a series of yielding rubber flaps 19 curved downwardly and rearwardly terminating in horizontal ground contacting portions 20 which end in the rear trailing edges 21.

Side plates 22 are fixed to the lower rearward portions of the ends of the cylindrical frame 10 and are connected to the side edges 15a of the intake end of the manifold 15 and have outer edges 23 curving downward and rearwardly and having horizontal portions 24 adapted to skid along the ground surfaces 25 and conforming substantially to the normal shape of the flaps 19. The upper edges 26 are interconnected by a laterally extending horizontal baffle plate 27 which is connected at its forward edge 28 to the cylindrical frame 10 and on its rear edge 29 is hinged a damper plate 30 which can swing from a normally downwardly hanging vertical position rearwardly and upwardly to ride over obstructions such as rocks which the apparatus may pass in the field. The damper plate may also be made adjustable in its swinging movement to determine the amount of air flowing in past the lower edge 31 of the damper plate and the trailing edges 21 of the rubber flaps 19 as indicated by the arrow 32.

A ground contacting wheel 33 may be provided pivotally mounted on an arm 34 pivotally carried on a pin 35 held in the brackets 36 fixed to the front wall 36a of the suction manifold 15 and having an adjustable clamp bolt 37 operating in elongated arcuate slots in the brackets 36 for positioning the frame 10 in proper operating position relative to the ground surface 25.

In operation, the apparatus is moved over the ground surface in the direction of the arrow 38, FIG. 4, with the bottom horizontal portions 20 of the flaps 19 sliding over the ground surface 25 and over the cotton clumps 39 to be picked up. In so doing, the surfaces 20 of the flaps 19 roll up the cotton at 40, tearing it away from the ground 25. As soon as the cotton rolls to the end trailing edges 21 of the flaps 19 it springs up at 41 and with the suction inflow 32 the cotton is pulled up over the trailing edges and into the suction chamber 43 and thence up through the manifold for delivery to a suitable receptacle or truck or trailer for transportation to the cotton gin.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

A cotton pick-up apparatus comprising in combination:
A. a frame having a pre-determined direction of movement over the ground surface,
B. a suction chamber formed on said frame adapted to maintain a reduced pressure below atmospheric pressure including,
C. a suction manifold connected to said suction chamber to withdraw air from the top portion thereof,
D. a series of laterally disposed yielding flaps having their upper edges connected to said suction manifold and extending downwardly and rearwardly of said frame and terminating in trailing edges sliding along the ground surface and forming the forward and bottom walls of said suction chamber,
E. an adjustable damper plate pivotally mounted on said frame and forming a portion of said suction chamber having an outer edge cooperating with said trailing edges of said flaps to form an air inlet passageway over the ground surface adjacent said trailing edges to inject cotton exposed at said trailing edges into said suction chamber.

References Cited by the Examiner
UNITED STATES PATENTS

| | | | |
|---|---|---|---|
| 1,220,132 | 3/1917 | Jenkins. | |
| 2,235,226 | 3/1941 | Lofgren et al. | 15—420 |
| 2,328,713 | 9/1943 | Dowd et al. | |
| 2,894,274 | 7/1959 | Coons | 15—421 |

ANTONIO F. GUIDA, *Acting Primary Examiner.*

M. C. PAYDEN, R. R. KINSEY, *Assistant Examiner.*